United States Patent [19]

Berry

[11] Patent Number: 5,000,850
[45] Date of Patent: Mar. 19, 1991

[54] APPARATUS FOR DEWATERING AN AQUEOUS CLAY SUSPENSION

[75] Inventor: Harold B. Berry, Macon, Ga.

[73] Assignee: Engelhard Corporation, Edison, N.J.

[21] Appl. No.: 905,900

[22] Filed: Sep. 10, 1986

[51] Int. Cl.$^5$ ............................................. B01D 33/073
[52] U.S. Cl. ..................................... 210/375; 210/386; 210/402; 210/406
[58] Field of Search ............... 210/784, 402, 374, 375, 210/386, 406

[56] References Cited

U.S. PATENT DOCUMENTS

| | | | |
|---|---|---|---|
| 2,860,973 | 11/1958 | Wells | 210/784 |
| 3,170,388 | 2/1965 | Reichstein | 210/402 X |
| 3,244,281 | 4/1966 | Kurz et al. | 210/784 |
| 4,166,034 | 8/1979 | Bodine | 210/784 X |
| 4,279,760 | 7/1981 | Yamamoto | 210/784 |
| 4,450,080 | 5/1984 | Dodd | 210/402 X |
| 4,470,913 | 9/1984 | Kieronski | 210/386 X |
| 4,673,496 | 6/1987 | Turner, Jr. | 210/402 X |

Primary Examiner—Tom Wyse

[57] ABSTRACT

Apparatus is provided for dewatering an aqueous clay suspension by a process which includes preparing a partly dewatered filter cake and concurrently compressing the partly dewatered filter cake on a filtration drum while applying vacuum suction to it from inside the drum, and then removing the dewatered cake from the filter. The process also purifies the filter cake. An apparatus suitable for carrying out the process comprises a rotary vacuum filter, means for compressing the clay filter cake on the filter medium and means for applying vacuum filtration to the same portion of the cake being compressed. The compression means may comprise a rotatable roll mounted for rolling compressive contact with the filter cake. The rotatable roll may have a non-stick bearing surface to which solids of the filter cake are substantially non-adherent. The rotatable roll may be a pneumatic roll designed to conform to the filter drum and increase the size of the contact zone between the filter drum and the compression roll.

16 Claims, 2 Drawing Sheets

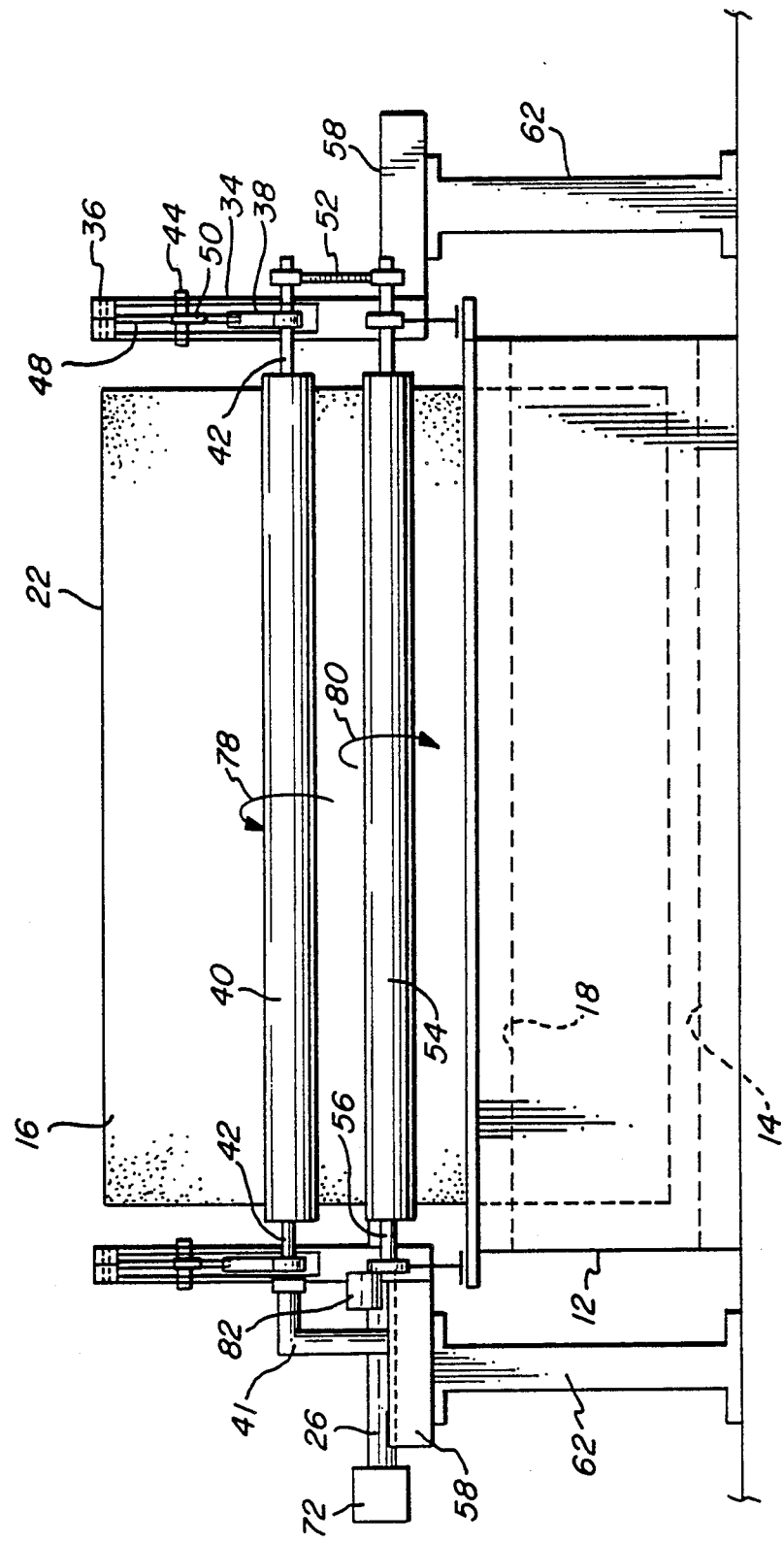

APPARATUS FOR DEWATERING AN AQUEOUS CLAY SUSPENSION

BACKGROUND OF THE INVENTION

1. Field Of The Invention

This invention relates generally to process and apparatus for dewatering aqueous clay suspensions by filtration thereof.

2. Description Of The Related Art

In the treatment of clay materials for commercial use, it is conventional practice to subject the raw mined clay to a plurality of processing steps, such as fractionation, bleaching, and removal of magnetic and paramagnetic impurities, etc., where the clay being processed is in the form of an aqueous clay suspension or slurry. The aqueous suspension form of the clay material is advantageous from the standpoint of facilitating its contact with treatment chemicals as well as transport and storage of the clay material. Regardless of the specific sequence and character of the processing steps, however, it generally is desirable to increase the solids levels of the aqueous clay suspensions above the concentrations utilized in the aforementioned processing steps for transport, storage and end use.

Accordingly, it is conventional practice to dewater the aqueous clay suspension following the aforementioned processing steps.

For dewatering of aqueous clay suspensions, rotary vacuum filters have come into widespread usage. Such filters enable the aqueous clay suspensions to be dewatered to solids levels on the order of about 56–63 percent solids depending on the conditions employed during the dewatering step. Nonetheless, there has been a continuous and ongoing effort to improve the dewatering capability of rotary vacuum filters. Much of the effort to improve dewatering has been focused on applications where the clay suspension is spray dried downstream of the filter, for example, since a 1–2% increase in the weight percent of solids can significantly lower the cost of energy required to operate the spray drying process.

A variety of methods and means have been attempted. For example, Komline-Sanderson brochure KSB-5L0-7902 (copyright 1977) by the Komline-Sanderson Company, describes optional accessories and modifications for the Komline-Sanderson Flexibelt Filter as including a compression and wash assembly. For example, such assembly consists of a support frame, one floating roll, two compression rolls, a series of belt rolls, a belt guide mechanism, two cake wash drip pipes, an excess wash trough and a compression and wash belt. The purpose of this assembly, as stated in the brochure, is to allow more uniform washing of the filter cake after it is formed, to reduce cake cracking and to reduce the moisture content of the cake by compression.

Others have attemped to increase the solids of the clay by increasing the vacuum inside the filter drum. However, this increases the passage of solids through the filter cloth or medium and additionally tends to decrease filtration efficiency by blinding the filter.

SUMMARY OF THE INVENTION

One aspect the present invention relates to an improved process for dewatering an aqueous clay suspension. The process also purifies the filter cake. In accordance with the invention, the process comprises forming a partly dewatered filter cake and concurrently pressurizing and applying a vacuum suction to the filter cake during passage of the filter cake through a filtration zone.

In another aspect, the invention provides for applying vacuum suction on one side of the filter cake and pressurizing the filter cake on the opposite facing side thereof.

Another aspect of the invention includes supporting the filter cake on a foraminous support, applying the vacuum suction to one side of the support to withdraw liquid from the suspension therethrough and yield the dewatered filter cake on the support, and removing the filter cake from the support.

In another aspect of the invention, as described above, the filter cake is compressed by passing the cake in contact with a rolling compression means while the cake supported on the foraminous support in the filtration zone and vacuum suction is applied concurrently to the opposite side of the support in the filtration zone. The rolling compression is co-directional with the direction of passage of the filter cake through the filtration zone and may be affected by maintaining a rotatable roll in compressive contact with the filter cake.

In another aspect, the rotatable roll in the above-described process has a substantially cylindrical bearing surface to which solids of the filter cake are substantially non-adherent, such as a bearing surface formed of a fluorocarbon polymer or copolymer, e.g., polytetrafluoroethylene. In another and further improved aspect, the rolling compression zone comprises a resilient roll such as may be provided by pneumatic or hard rubber tires. The purpose of the resilient roll is to conform to the filter and thereby increase the size of the contact zone between the filter cake and the roll, thereby further increasing the dewatering action.

In another aspect, the suspension is passed through the filtration zone along an arcuate path, e.g., as defined by a circumferentially extending filter surface of a rotary vacuum filter.

The rotatable roll may be passive, i.e., driven by friction off the rotary vacuum filter or may be independently driven.

A further aspect of the invention relates to a process as described above, utilizing a rotary vacuum filter wherein the vacuum filter is rotated at a rotational velocity proportional to the rotational velocity of the rotatable roll, to provide the filter and the rotatable roll with the same or substantially the same peripheral velocities.

In another aspect, the present invention relates to improved apparatus for dewatering an aqueous clay suspension or the like including a vacuum filter, e.g., a rotary vacuum filter having a filtration medium carried thereon, the filtration medium having a feed side and an opposite, suction side, means for feeding the aqueous clay suspension onto the feed side of the filtration medium, suction means for applying vacuum to the suction side of the filtration medium, removal means for removing the resulting filter cake from the filtration medium, and compression means for applying pressure to the filter cake on the filler medium in opposite facing proximity to the suction means.

Another aspect of the invention relates to an apparatus as described above, wherein the filter cake compression means comprises a rotatable roll mounted for compressive contact with the filter cake in opposite facing proximity to the suction means.

A further aspect of the invention relates to apparatus as described above, wherein the rotatable roll has a cylindrical bearing surface to which solids of the filter cake are substantially non-adherent, such as a bearing surface formed of a fluorocarbon polymer or copolymer, e.g., polytetrafluorethylene.

A further aspect of the invention comprises an apparatus as described above wherein the compression means comprises rotatable resilient means. Preferably, the resilient means is a pneumatic roll, for example, one or more pneumatic tires on a common axis.

Other aspects of the invention relate to apparatus as described above wherein the rotatable roll is adjustably mounted to effect variable compressive contact with the filter cake and/or is mounted proximate to the removal means for compressive contact with the filter cake.

Additional apparatus aspects of the invention include: the removal means comprising a take-off roll; each of the rotatable roll and the take-off roll being mounted in a common frame with their axes of rotation parallel to one another; the rotatable roll being mounted for rotation on a shaft, and the shaft at each of its ends being connected to a rigid arm pivotally joined at its opposite end to the frame; and means for rotating the rotary vacuum filter at a peripheral velocity substantially equal to the peripheral velocity of the rotatable roll.

Other aspects and features of the present invention will be apparent from the ensuing disclosure and appended claims.

BRIEF DESCRIPTION OF THE DRAWINGS

FIG. 2 is a frontal elevational view of a portion of the FIG. 1 apparatus, wherein some parts and elements have been deleted for clarity to show the details of the apparatus.

DETAILED DESCRIPTION OF THE PREFERRED EMBODIMENTS

Figure 1:
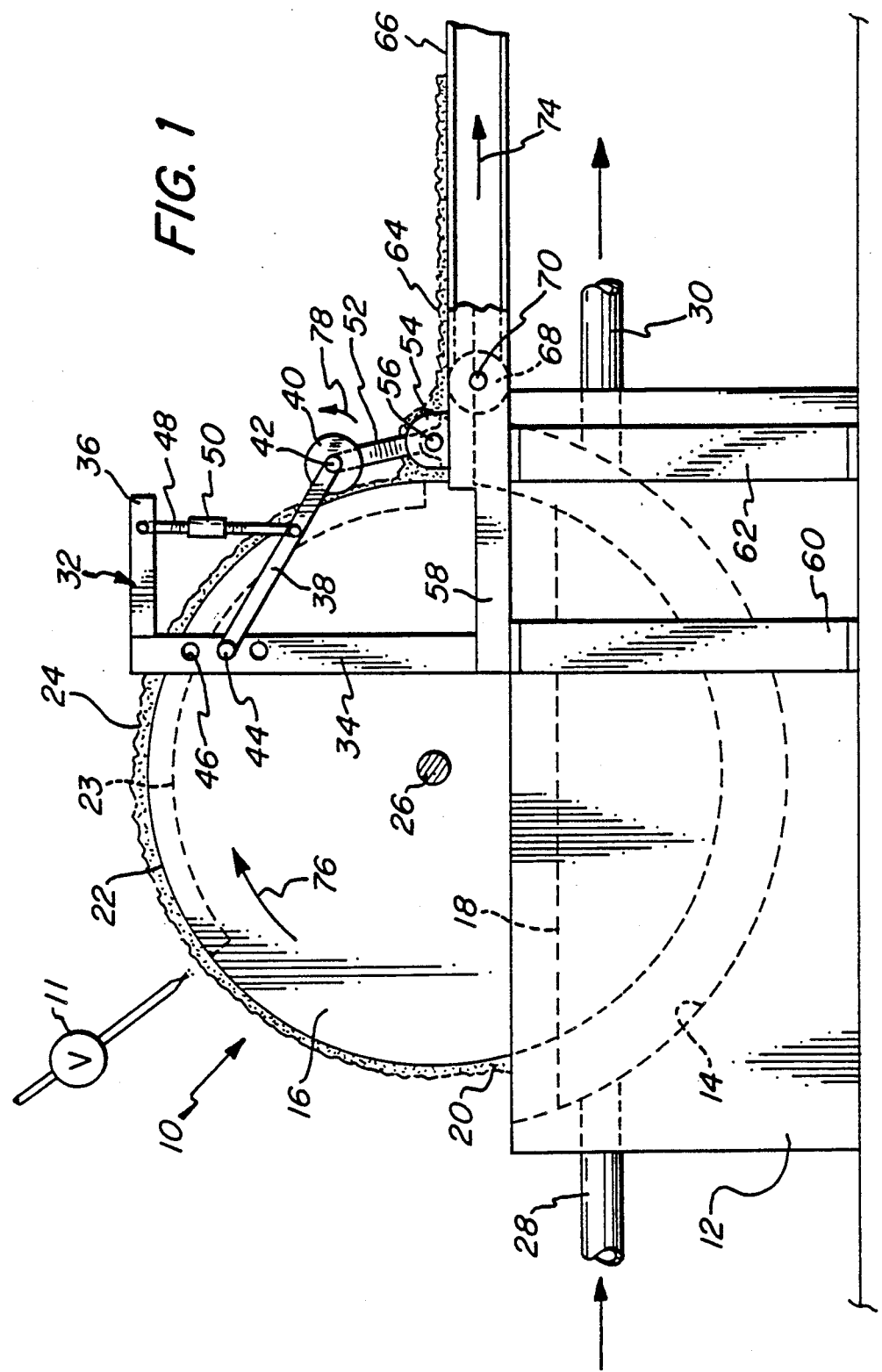
FIG. 1 is a side elevational view of an apparatus for dewatering an aqueous clay suspension in accordance with the present invention in an illustrative embodiment thereof.

As indicated hereinabove, conventional rotary vacuum filters are capable of dewatering aqueous clay suspensions to yield filter cakes containing on the order of about 56–63% by weight of solids (dry basis).

The process and apparatus of the present invention, as applied in such rotary vacuum filter systems, has been found to significantly increase the product filter cake solids, on the order of about 2% by weight. As a result, product filter cakes are achievable containing solids levels on the order of about 58–65%. Those skilled in the art will appreciate that in such an increase in product solids translates into large savings of energy in the downstream drying process and in cost reductions associated with transport and storage of the resulting dewatered material due to its reduced volume.

The improvement afforded by the invention in increasing filtrate removal from the aqueous clay suspension to produce higher filter cake solids, will also yield surprisingly higher product specific resistance. While specific resistances in the range of 2000–3000 ohms are typical of conventional products, specific resistances as high as 6000 ohms have been obtained from the present process. Specific resistance is, of course, a measure of the level of impurities contained in the dewatered clay product such impurities including iron and titanium compounds. The increased specific resistance suggests the process of this invention effectively reduces such impurities.

The aqueous clay suspension which may be dewatered by the process and apparatus of the present invention may comprise any suitable aqueous suspension or slurry of clay particles and/or aggregates which may be dewatered by vacuum filtration. The invention has been particularly usefully employed in the dewatering of kaolin clay slurries, especially acidic kaolin slurries, but may be utilized for any other suitable aqueous clay suspensions. Flocculating agents such as sulfuric acid, alum and the like are useful when added prior to the dewatering step.

An illustrative embodiment of apparatus according to the present invention, suitable for carrying out the process of the invention, is shown in FIGS. 1 and 2, and described below.

As illustrated, the rotary vacuum filter 10 comprises a slurry tank 12. In the interior volume of the tank an arcuate wall segment 14 defines a slurry trough for retaining a suitable volume of the aqueous clay suspension.

The slurry tank is connected to inlet conduit 28 terminating at the arcuate wall segment and to outlet conduit 30.

Disposed in the slurry tank is a vacuum filter drum 16 having an outer cylindrical surface 22. The filter drum is mounted on shaft 26 joined to suitable drive means 72 (see FIG. 2).

Associated with the rotary vacuum filter is a frame 32 comprising spar 36 joined to stanchion 34, in turn reposed on base member 58 mounted on support beams 60 and 62.

Stanchion 34 is provided with a plurality of pin mount openings 46 by which rigid arm 38 may be connectingly and pivotally pinned by pin 44 to the stanchion. The pinned end of the rigid arm thus may be uncoupled from a given pin mount opening and repositioned in another pin mount opening in the stanchion, either vertically above or below its original position, by simple repositioning of the pin in the desired opening.

The rigid arm 38 is pivotally joined at an intermediate segment of its length to coupling brace 48. The coupling brace at its opposite end is pivotally joined to the spar 36. To accommodate adjustment of the length of the connecting brace 48 in connection with variable positioning of the pinned end of rigid arm 38, the coupling brace is provided with a turnbuckle 50. The turnbuckle may be adjusted to provide the requisite length for the coupling brace in the given application.

The trailing end of rigid arm 38 is coupled with shaft 42, having mounted thereon rotatable roll 40. This roll may be mounted such that it is freely rotatable in response to the application of any circumferential force on the outer cylindrical (bearing) surface of the roll. Alternately, the roll may be driven by any suitable motor at a peripheral speed which essentially matches that of the vacuum drum.

The bearing surface of the rotatable roll suitably has a surface characterized by a low coefficient of friction. Preferably, this roll has a cylindrical bearing surface to which solids of the filter cake produced in the system are substantially non-adherent. Such bearing surface suitably may be formed on a metal roll by application of a fluorocarbon polymer or copolymer, such as polytetrafluoroethylene, tetrafluoroethylene/hexafluoropropylene copolymer, and other polyfluoroalkene polymers and copolymers. Roll 40 may be constructed of a cylinder of resilient material such as could be formed by a pneumatic or soft rubber tire or plurality of tires or a common axis. The purpose of the resilient roll is to increase the surface of the pressure roll in contact with the filter drum. The roll may be coated with silicone or other means to make it substantially non-adherent to the filter cake.

Further coupled to shaft 40 of the passively rotatable roll is a follower beam 52, pivotally attached to the shaft 42 at one end and pivotally attached to shaft 56 at its other end. Mounted on shaft 56 is take-off roll 54.

In close proximity to the take-off roll 54 is conveyor belt 66, mounted on conveyor roll 68, which in turn is disposed on shaft 70 joined to suitable drive means (not shown) for translation of the conveyor belt in the direction indicated by the arrow 74.

In operation, the aqueous clay suspension is introduced by inlet conduit 28 into the slurry tank 12 to provide a slurry volume therein having a liquid height 18 with the filter drum 16 being rotated by drive means 72 for rotation in the direction indicated by arrow 76. Slurry may be discharged from the tank as required in outlet conduit 30 for recycle or disposal. Alternatively, the slurry tank may be provided with only inlet conduit 28 such that all liquid in the influent slurry is removed during the vacuum filtration operation, with the remainder of the non-removed liquid being carried as a component of the product filter cake out of the system. The aqueous clay suspension 20 from the slurry tank thus is introduced onto the outer cylindrical surface 22 of the filter drum during its rotation. The outer cylindrical surface of the filter drum comprises a filter medium such as a foraminous support in the form of fine-mesh cloth or other suitable medium, and thus defines an arcuate path of travel of the aqueous clay suspension.

The vacuum suction means are shown in dotted line at 23, with details omitted for clarity, but are of conventional type, such as comprising vacuum boxes or a vacuum plenum space joined in gas flow communication to an exhaust blower or other means for creating a negative pressure inside the filter drum. This results in a suction so that liquid is withdrawn from the filter cake through the foraminous support of the outer cylindrical surface. In practice, maintaining a vacuum of 22–23 inches of mercury is economically feasible in the vacuum boxes or plenums.

In such fashion, water is removed from the supported aqueous clay suspension to yield a partially dewatered filter cake 24 on the filter medium, which comprises a foraminous support.

As the filter cake 24 passes through the vacuum filtration zone provided by the vacuum filter drum, it may be contacted by rinse water introduced through valve 11 to remove salts and other impurities from the filter cake. Thereafter, the cake encounters the passively rotatable roll 40 whose outer cylindrical bearing surface serves to compress the filter cake concurrently with the application of vacuum suction. Such action provides enhanced dewatering and increase of specific resistance of the filter cake, significantly beyond obtained in the absence of the rotatable roll.

Rotatable roll 40 is seen in FIG. 1 to be in "opposite facing proximity" to the vacuum suction zone 23 which term, as used herein and in the claims, means that it is on the opposite side of a portion of the same section of the filter medium at which the suction zone is located, and faces the latter. Roll 40 may be a passively rotatable means that is not in any way driven or otherwise coupled to direct motive means or it may be driven by suitable drive means. If it is a passively rotatable roll, it is allowed to freely rotate in response to the rotation of the filter cake on the filter drum outer cylindrical surface, which induces by friction drive a relative counter-rotational motion of the passively rotatable roll in bearing relationship to the filter cake. In such fashion, roll 40 is induced to rotate in the direction indicated by arrow 78, whereby roll 40 exerts rolling compression on the filter cake which is co-directional with the direction of passage of the filter cake through the vacuum filtration zone, i.e., the cylindrical bearing surface of the roll 40 and the filter cake on filter drum 16 at their point of mutual contact are being translated in the same tangential direction. The illustrated frame construction serves to maintain the passively rotatable roll in compressive contact with the filter cake, with the position of such compressive contact along the drum surface being variable by adjustment of the position of pin 44 coupling rigid arm 38 to stanchion 34.

The passively rotatable roll, as indicated, has a cylindrical bearing surface to which solids of the filter cake preferably are substantially non-adherent. There is thus no disruption of the filter cake by the roll except to exert compressive force on the filter cake to enhance dewatering in conjunction with vacuum suction filtration of the aqueous clay suspension. Alternatively, and preferably, rotatable roll 40 is driven by a suitable drive means, e.g., a suitably geared drive coupling 41 (FIG. 2) connected to shaft 26. The peripheral velocity of rotatable roll 40 and the drum surface, and hence the filter cake, is maintained substantially the same at the nip or point of contact therebetween. Positively driving rotatable roll 40 tends to overcome any tendency of it to slip and not rotate as may occur when it is friction-driven by contact with the filter cake on the rotating drum, as may occur due to the preferred use of a non-stick surface on rotatable roll 40, i.e., a surface to which solids of the clay filter cake are non-adherent. Whether passively driven or, as is preferred, positively driven, rotatable roll 40 is mounted in such a fashion such that it exerts compressive force on the filter cake in cooperation with an operative vacuum suction zone (23 in FIG. 1) on the interior of the filter drum.

After the filter cake has been compressed by the rotatable roll, it encounters take-off roll 54, mounted on shaft 56 and driven in the direction indicated by arrow 80 by means of reverse gear coupling 82 (see FIG. 2) to shaft 26 driven by drive motor 72. By virtue of the reverse direction of movement of the take-off roll relative to the direction of movement of the filter drum outer cylindrical surface tangentially adjacent thereto, the take-off roll effects removal of the filter cake from the outer cylindrical surface of the filter drum, conveying the product filter cake 64 onto the upper surface of conveyor belt 66 while same is being translated in the direction indicated by arrow 74. It is also important that the operation of the conventional vacuum system within the drum be timed so that the vacuum is turned off in cooperation with the take-off roll. In such manner, the product filter is discharged from the system to downstream spray drying treatment or other processing and/or end use steps.

EXAMPLES

A variety of examples illustrate the improved dewatering achieved by the methods and means of this invention.

Example 1

This example is carried out in pilot plant apparatus having a 4.5 ft. diameter of the vacuum drum as described with reference to the drawing. This example is carried out utilizing a feed slurry of kaolin #2 clay containing 21.4% by weight of clay in water in a slurry tank. The drum is rotated such that the peripheral speed is about 10.0 ft/min and each revolution occurs in 1 minute and 25 seconds. A constant suction is applied inside the vacuum drum resulting in a sub atmospheric pressure of 22-23 inches of mercury inside the drum such that water is sucked from the filter cake through the filter on the surface of the drum. Example 1 illustrates the conventional operation without the application of any external pressure. In Example 1, clear filtrate is discharged at the rate of 13.3 gallons per minute. The resultant product of caked solid clay contains 58.3% by weight of solids.

Example 2

In this example, a teflon coated, substantially cylindrical pressure roll is employed as described with reference to the drawings. The weight and position of the roll results in an external pressure which is calculated to be about 18-20 p.s.i. Filtrate is discharged at 13.0 gallons-per-minute and other conditions are as described in Example 1. In this example, the product filter cake is increased to 62.0% by weight solids as a result of the external pressure applied by means of the roll in cooperation with internal suction.

Table 1 below further illustrates the improvement in dewatering obtained with the invention utilizing the pilot apparatus of Example 1 both with and without the pressure roll of Example 2. The table includes the runs of Examples 1 and 2.

TABLE 1

| External Pressure | G.P.M. | % Solids (wt.) |
|---|---|---|
| None | 13.3 | 58.3 |
| None | 12.9 | 58.9 |
| None | 13.6 | 59.4 |
| 18-20 p.s.i. | 9.5 | 60.4 |
| " | 10.6 | 59.9 |
| " | 10.7 | 60.8 |
| " | 13.0 | 62.0 |
| " | 11.1 | 59.9 |

The following examples further illustrate the dewatering improvements achievable by application of external pressure to the filter cake disposed on the drum during the dewatering operation.

Examples 3-9

Examples 3-9 are carried out in pilot apparatus as described in Example 1. The roll position refers to the pressure roll 40 as shown in the drawings. In Position "A", the roll is positioned about 15 degrees from a vertical line through shaft 26. In position "B", (as shown in FIG. 1 of the drawing) the roll is positioned at about 35 degrees from vertical. In these examples, LVHT clay is employed which is a low viscosity material (80% finer than 2 microns).

TABLE II

| Example # | Specific Resistance ohms | Roll Position | % Solids |
|---|---|---|---|
| 3 | 2466 | none | 60.2 |
| 4 | 6353 | A | 61.6 |
| 5 | 4655 | B | 62.1 |

In Examples 3-5, the drum speed is 63 sec./revolution and 2.0 gallons per minute of rinse water were employed.

TABLE III

| Example # | Rem. | Specific Resistance ohms | Roll Position | % Solids |
|---|---|---|---|---|
| 6 | 125.1 | 3576 | B | 62.6 |
| 7 | 106.2 | 2397 | B | 63.2 |
| 8 | 87.3 | 2764 | none | 60.5 |
| 9 | 81.6 | 2136 | none | 61.0 |

The units of water removal (Rem.) in Table III are pounds of water per minute. The drum speed is 210 seconds per revolution. No rinse water is employed in Examples 7 and 9 while 2.0 gallons per minute are used in Examples 6 and 8.

Comparison of Examples 6 versus 8 and 7 versus 9, for example, illustrate the dramatic improvements in dewatering and purification achievable with this invention.

Example 10

In this example, the diameter of the filter drum is 11.5 ft. The pressure roll consists of a teflon coated cylinder. The pressure roll is positioned essentially as shown in FIG. 1, i.e., about 40 degrees from vertical position The filter drum is rotated at 1 revolution per L minute achieving a peripheral velocity of about 36 ft.-per-minute. The pressure roll is also driven by a motor which achieves a corresponding peripheral speed. In this case a fine clay (90% passes a 2 micron filter) slurry having an initial concentration of 15.4% solids in water is picked up on the filter roll resulting in a filter cake about less than one and one-half inches thick. Prior to introduction to the filter, the preparation is flocculated to a pH of 4.0 by addition of alum and the temperature is 70° F. The resulting filter cake is removed and contains 58.8% solids. In operations of the apparatus without use of the pressure roll, a solids cake of 56.3% is consistently achieved employing the same vacuum suction of 23 inches of mercury inside the vacuum filter. In this example, the average rates of filtrate discharged is 17.1 Gal/Min. with about 1% solids in the filtrate.

Example 11

In this example, pressure roll 40 is a small pneumatic tire about 6-inches in diameter and 3-inches wide. The roll is applied to the pilot apparatus and process of Examples 1 and 2. The tire surface is treated to reduce friction and partly inflated to about 5 p.s.i. In operation, the tire-roll provides an expanded zone of contact with the filter drum and increases dewatering of the cake.

Other modifications and alterations will become apparent to those skilled in the art upon reading and understanding the foregoing, which modifications and alterations are believed to be within the scope of the appended claims.

What is claimed is:

1. An apparatus for dewatering aqueous clay suspensions comprising a vacuum filter having a filtration medium carried thereon, the filtration medium having a feed side and an opposite, suction side, means for feeding an aqueous clay suspension onto the feed side of said filtration medium, suction means for applying vacuum to the suction side of said filtration medium, removal means for removing the resulting filter cake from said filtration medium, and resilient compression means for applying pressure to the filter cake on the filter medium in opposite facing proximity to the suction means.

2. The apparatus of claim 1 wherein said filter is a rotary vacuum filter and said filter medium is carried on the cylindrical surface thereof.

3. The apparatus of claim 2 wherein said compression means comprises a rotatable roll mounted for compressive contact with said filter cake in opposite facing proximity to said suction means.

4. The apparatus of claim 3 wherein said rotatable roll has a cylindrical bearing surface to which solids of said filter cake are substantially non-adherent.

5. The apparatus of claim 4 wherein said cylindrical bearing surface is formed of a fluorocarbon polymer or copolymer.

6. The apparatus of claim 4 wherein said cylindrical bearing surface is formed of polytetrafluoroethylene.

7. The apparatus of claim 3 wherein said rotatable roll is adjustably mounted for variable compressive contact with the filter cake.

8. The apparatus of claim 3 wherein said removal means comprise a take-off roll, and said rotatable roll and said take-off roll are mounted in a common frame with their respective axes of rotation parallel to one another.

9. The apparatus of claim 8 wherein said rotatable roll is mounted for rotation on a shaft, and said shaft at each of its ends is connected to a rigid arm pivotally joined at its opposite end to said frame.

10. The apparatus of claim 3 further comprising means for rotating said rotary vacuum filter at a peripheral velocity substantially equal to the peripheral velocity of said rotatable roll.

11. The apparatus of claim 3 including drive means connected to drive said rotatable roll at a selected peripheral velocity.

12. The apparatus of claim 2 wherein said removal means comprises a take-off roll.

13. The apparatus of claim 2 wherein said compression means comprises a resilient roll.

14. The apparatus of claim 13 wherein said resilient roll comprises a pneumatic roll.

15. An apparatus for dewatering aqueous clay suspensions comprising: (a) a rotary vacuum filter drum having a cylindrical surface on which a filtration medium is carried, the filtration medium having a feed side and an opposite, suction side, (b) means for feeding an aqueous clay suspension onto the feed side of said filtration medium, (c) suction means for applying vacuum to the suction side of said filtration medium, (d) removal means for removing the resulting filter cake from said filtration medium, and (e) resilient compression means comprising a rotatable pneumatic roll having a cylindrical bearing surface to which solids of the filter cake are substantially non-adherent, said resilient compression means being mounted to apply pressure to the filter cake on the filter medium in opposite facing proximity to the suction means.

16. The apparatus of claim 15 including drive means to drive said rotatable pneumatic roll at a selected peripheral velocity, and means for rotating said rotary vacuum filter at a peripheral velocity substantially equal to the peripheral velocity of said rotatable roll.

* * * * *